2,817,426

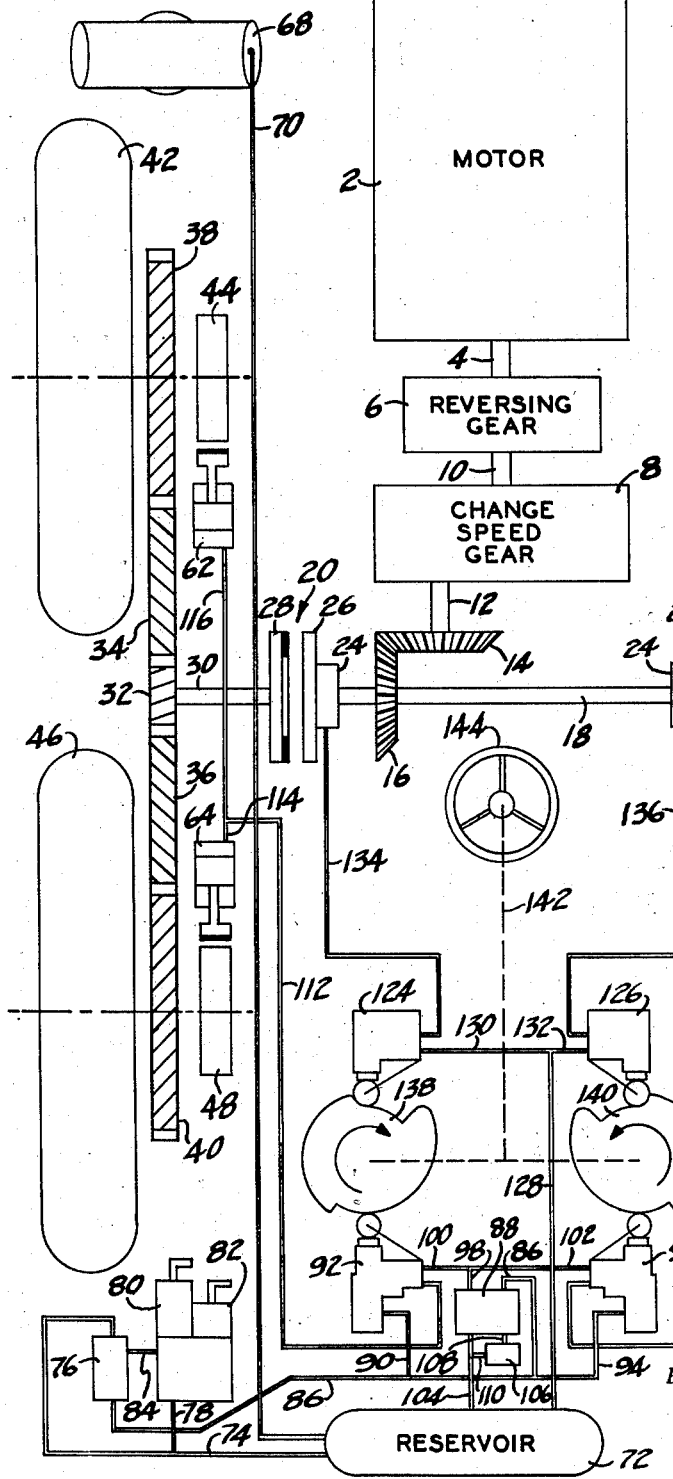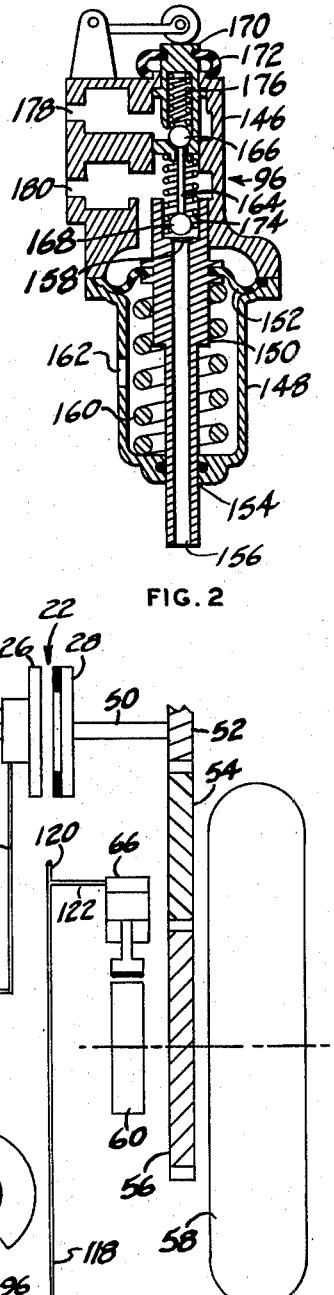
Dec. 24, 1957 R. B. CLARK ET AL 2,817,426
CONTROL SYSTEM
Filed Sept. 17, 1956
FIG. 1
FIG. 2
INVENTORS:
RALPH B. CLARK
JOHN H. HYLER
BY John F. Schmidt
ATTORNEY United States Patent Office 2,817,426
Patented Dec. 24, 1957

CONTROL SYSTEM

Ralph B. Clark, Morton, and John H. Hyler, Peoria, Ill., assignors to LeTourneau-Westinghouse Company, Peoria, Ill., a corporation of Illinois Application September 17, 1956, Serial No. 611,412

3 Claims. (Cl. 192—13)

This invention relates to a control system, and especially to such a system for an automotive vehicle which is steered by means of the brakes.

One of the applications of this invention is to railroad equipment, more specifically to rubber-tired railroad equipment. It has been customary for years to use switching locomotives in railroad terminal yards which operate on tracks. The use of such equipment is of course limited by the fact that the switching locomotive must be moved about in accordance with the track layout. In a device as in this invention, a rubber-tired switching locomotive can be used to move railroad cars along the rails as desired, and can then be transferred from job to job by taking the nearest route across the tracks. Such a switching locomotive is desirably provided with conventional railroad pneumatic brakes. Such a locomotive is also preferably skid-steered in order to provide an extremely short turning radius. Inasmuch as the skid-steering is accomplished by means of brakes, some combination of steering and brake control must be worked out which is satisfactory under the circumstances encountered by such equipment.

A rubber-tired switching locomotive such as the one disclosed here, being skid-steered, can turn in a very small circle when it is operating by itself. For a minimum turning radius, it must of course be steered by completely locking the wheel brakes on one side. As will be understood by those skilled in the art, the locomotive cannot be turned through such a small space when it is pulling or pushing one or more cars. When the locomotive operates as part of a train, it must be steered in such a way as to avoid locking of the wheel brakes, and this is preferably done without impairing steerability of the vehicle.

It is accordingly an object of this invention to provide controls for a switching locomotive which permit skid-steering of the locomotive, and which permit braking of the locomotive according to conventional railroad practise. It is another object of this invention to provide controls for a switching locomotive which is braked in a conventional railroad manner and which is steered by means of the brakes, and in which the wheel brakes cannot be locked during steering when more than a predetermined maximum braking pressure is applied. These and other objects are disclosed in the following description and in the appended drawings, in which Fig. 1 is a schematic view or circuit diagram presenting a schematic layout of a switching locomotive embodying the invention; and Fig. 2 is a detailed view in section through one of the valves used in the control system.

Referring now to the drawings in detail, a suitable source of power is shown at 2; this may be any conventional type of motor as for example an internal combustion engine. Motor 2 delivers power by means of a drive shaft 4, drive shaft 4 being connected with suitable reversing gear apparatus indicated at 6. The reversing gear 6 is connected with a change-speed gear 8 by means of a shaft 10, and change-speed gear 8 is provided with an output shaft 12 on which there is secured for rotation therewith a bevel gear 14.

Gear 14 meshes with a gear 16, which is mounted on and rotates with a cross shaft 18. Shaft 18 is connected at its ends to fluid pressure operated disengageable elements or clutches 20 and 22. Each of the clutches includes a fluid pressure motor 24 and clutch plates 26 and 28. Clutch plate 28 of clutch 20 is connected with an output shaft 30 which drives a gear 32 mounted on shaft 30 for rotation therewith. Gear 32 meshes with idler gears 34 and 36, which in turn mesh with wheel drive gears 38 and 40 respectively. Wheel drive gear 38 is mounted on the axle of a wheel 42, and a brake drum 44 is also mounted on the axle. Wheel drive gear 40 is mounted on the axle of a wheel 46, and a brake drum 48 is also mounted on the axle of wheel 46.

Similarly, of course, the wheels on the right side (as seen in Fig. 1) of the vehicle are connected with clutch 22, although only one wheel is shown on the right side in the figure, the other being broken away to make room for a view of the valve shown in Fig. 2. Thus, clutch plate 28 is connected with a shaft 50 which carries a gear 52. Gear 52 meshes with idler gears, one of which is shown at 54, and the idler gears mesh with wheel drive gears; in the drawings, idler gear 54 is shown in mesh with wheel drive gear 56. Gear 56 is mounted on the axle of a wheel 58, and a brake drum 60 is mounted on the same axle.

As indicated above, conventional air brakes, similar to those used in railroad equipment, are intended to be used on a vehicle of the type here shown. In the drawings, air brakes are shown schematically at 62, 64, and 66 for wheels 42, 46, and 58 respectively.

The brakes for the switching locomotive here shown are controlled by completely conventional railroad brakes such as are shown in Instruction Pamphlet No. 5046-15 (June 1953) of the Westinghouse Air Brake Company, Air Brake Division, Wilmerding, Pennsylvania, this pamphlet being entitled 6-SL Brake Equipment for Diesel-Electric Yard Switching Locomotives. Inasmuch as brake equipment of this type is well understood by those skilled in the art, the system shown here is greatly simplified, showing merely those elements essential to bringing out the construction of the control system and its operation.

In the simplified brake system shown here, a multistage compressor is shown at 68. A conduit 70 connects compressor 68 with reservoir or receiver 72. Conduit 74 connects the reservoir with a distribution valve 76. A branch conduit 78 connects conduit 74 with brake valves 80 and 82, these being the conventional automatic and independent brake valves respectively of a conventional system. A conduit 84 connects the brake valves with distribution valve 76.

Distribution valve 76 is connected by means of a conduit 86 with a relay valve 88. A branch conduit 90 connects conduit 86 with a control valve 92 and another branch conduit 94 connects conduit 86 with a control valve 96. Relay valve 88 is connected with control valves 92 and 96 by means of a conduit 98 and branch conduits 100 and 102. A conduit 104 connects reservoir 72 with relay valve 88.

A pressure regulating valve 106 is provided in the system and is connected with relay valve 88 by a conduit 108 and with conduit 104 by a conduit 110.

Control valve 92 is connected with air brakes 62 and 64 by means of a conduit 112 and branch conduits 114 and 116. Control valve 96 is connected with the air brakes on the opposite side by means of a conduit 118 and branch conduits 120 and 122.

Reservoir 72 is connected with other control valves 124 and 126 by means of a conduit 128 and branch conduits 130 and 132. Control valve 124 is connected with the actuating element 24 of clutch 20 by means of a conduit 134. Control valve 126 is connected with the actuating element 24 of clutch 22 by means of a conduit 136.

Control valves 92, 96 and 124, 126 are cam actuated as is shown schematically in Fig. 1. Valves 92 and 124 are adapted and positioned to be actuated by a cam 138, while valves 96 and 126 are adapted and positioned to be actuated by a cam 140. Cams 138 and 140 are connected to be operated through suitable linkage shown schematically at 142 by a steering wheel 144.

Control valves 124 and 126 may be any of a suitable simple on-and-off type of valve, as for example the valves shown in Fig. 5 of Patent 2,580,372—Whitney, December 25, 1951, assigned to Westinghouse Air Brake Company. This valve is available commercially from the Westinghouse Air Brake Company as valve 2–C–1–B, and is shown on page 9357-33 of the Westinghouse Air Brake Company catalog. Valves of this type are well known in the art and need not be detailed here.

Control valves 92 and 96 may be any of a number of commercially available types. The valves here shown are modifications of the valve shown at 20 in Fig. 1 of Patent 2,714,943—Whaley, also assigned to Westinghouse Air Brake Company, and available from Westinghouse Air Brake Company as its H–3 control valve. Inasmuch as the valves 92 and 96 as used in this invention are modifications of the H–3 control valve, some details of this valve are shown in Fig. 2.

As there shown, the valve consists of an expansible chamber device having an upper body portion 146 and a lower body portion 148, the two portions being secured together in any suitable manner. Valve seat element 150 extends into bores in both body portions 146 and 148 and is movable therein by connection with a flexible diaphragm 152 which is securely clamped between the body portions. Valve seat element 150 extends through a suitably packed opening 154 in the lower body portion 148 and is provided with a substantially central bore 156 connecting the valve seat 158 with the atmosphere. A suitable spring 160 is provided in the lower body portion 148 to bias the valve seat element 150 in the upward direction as seen in Fig. 2. Lower body portion 148 is provided with a port 162. In the case of control valve 96, port 162 is connected with conduit 94; correspondingly, this same port of control valve 92 is connected with conduit 90. Thus, the lower face of diaphragm 152 is subjected to the fluid pressure in lower body portion 148, namely the fluid pressure in conduits 90 or 94 as the case may be.

The upper end of valve seat member 150 carries a bore which communicates with bore 156 and is larger than bore 156. The shoulder formed by the lower end of the larger bore provides the valve seat 158 referred to above.

A valve element 164, comprising an elongated stem having a ball 166 at one end and a ball 168 at its other end, is disposed with ball 168 in the upper end of valve seat element 150 and adjacent seat 158. A plunger 170 is movable in a bore in the upper end of upper body portion 146 of the control valve, passing through a bore in the upper end of portion 146 and being sealed by means of a flexible member 172. Plunger 170 has a lower face which engages a spring 174, spring 174 surrounding the stem which connects the two ball members 166 and 168 of valve element 164. Spring 174 biases plunger 170 upward as seen in Fig. 2.

Plunger 170 is itself provided with a bore and a valve seat, the bore receiving the stem of the valve element 164 and the seat being positioned and adapted to cooperate with ball 166. Ball 166 is normally biased against its seat by means of a spring 176.

The upper body portion 146 of control valve 96 (or 92) is provided with two ports 178 and 180. Port 178 communicates with the space in which ball 166 lies, while port 180 communicates with the space above diaphragm 152 and in which ball 168 lies. When ball 166 is lifted from its seat against the bias of spring 176, then ports 178 and 180 communicate with each other through the valve. When ball 168 firmly engages its seat, port 180 is shut off from communication with the atmosphere by way of bore 156.

Operation

For conventional braking, the operator actuates either of the controls 80 or 82, admitting brake air to branch conduits 90 and 94 in a manner that will be understood by those skilled in the art. As can be seen from Fig. 2, the pressure of the air thus admitted moves diaphragm 152 upward, carrying valve seat element 150 upward with it. Valve seat 158 engages ball 168, shutting off communication between port 180 and the atmosphere. Further upward movement of diaphragm 152 unseats ball 166 and communicates port 178 with 180, admitting air under pressure from reservoir 72 to the brakes by way of the following circuit: conduit 104, relay valve 88, conduit 98, branches 100 and 102, ports 178 of valves 92 and 96, past the ball 166 of each of these valves, ports 180 of the valves, conduits 112 and 118, and the branch conduits 114 and 116 going to brakes 64 and 62 respectively, and the branch conduits 122 and 120 going to the brakes on the other side, one of which is shown at 66. This operation of the brakes is completely conventional and will be well understood by those skilled in the art.

Let it be assumed that braking as such is not involved, but that the operator wishes to steer the vehicle. Let it further be assumed that he turns the steering wheel 144 to the right, actuating cam 140 through the linkage 142 while leaving cam 138 unaffected through suitable lost motion connecting means. As soon as cam 140 is rotated, valve 126 is operated to disengage clutch 22. Further rotation of cam 140 begins to actuate the cam follower of control valve 96, moving plunger 170 (Fig. 2) downward and carrying valve element 164 downward until ball 168 engages seat 158. Further downward movement of plunger 170 causes compression of spring 176 and unseating of ball 166, permitting air flow from port 178 to port 180 through the valve and operating the brakes on the right side of the switching locomotive.

It will be noted that the cam lobe for operating valve 96 increases gradually from a low point to a maximum. Accordingly, ball 166 will be disengaged a varying amount from its seat, depending upon the position of cam 140, which in turn depends upon how much wheel 144 is turned. Thus, the steering controls regulate the admission of fluid under pressure to the selected brake. If wheel 144 is turned "hard over," plunger 170 will be depressed a maximum and full air pressure will be applied to the brake, locking the wheels and effecting steering of the locomotive in its minimum steering circle.

It will be appreciated by men skilled in the art of railroad operations that it would be undesirable to have the switching locomotive wheels lock on one side when the locomotive is proceeding at any appreciable speed. If this were to happen with the locomotive running by itself, it could conceivably result in overturning the locomotive. If it were to happen with the locomotive coupled to one or more cars, it could result in substantial damage to the entire train. Accordingly, relay valve 88 is set to operate at a predetermined brake pressure (say, for example, 10 p. s. i.), so that when the predetermined pressure is reached, relay valve 88 is operated to disconnect conduit 98 from conduit 104, and connect conduit 98 with conduit 108, thus requiring that steering brake air pass through the pressure regulator 106, whereby steering air pressure is subjected to regulation under the control of the brake air. The result is a regulation of steering air pressure by the steering controls, and a further regulation by the brake air. Pressure regulator 106 will be adjustable and will be set at some value less than the pressure necessary to lock the wheel brakes. Thus, if the pressure necessary to lock the wheel brakes is 80 p. s. i., pressure regulating valve 105 could be adjusted to limit the maximum pressure on its low side to 70 p. s. i.—or any other value considered safe.

The foregoing description of the operation deals with actuation of cam 140 and valves 96 and 126, from which the operation of cam 138 and valves 92 and 124 will be readily understood by those skilled in the art.

It will be apparent from the foregoing that this invention provides conventional locomotive braking when desired, and that it also provides a novel method of steering the locomotive, and it further provides a safeguard against locking of the wheels when the brakes are applied. Other advantages will be apparent to those skilled in the art.

What is claimed is:

1. In a tractor having: at least one ground-engaging driven member on each side; a power source; means, including a fluid actuated disengageable element, connecting the power source with said member on one side; other means, including another fluid actuated disengageable element, connecting the power source with the member on the other side; a fluid actuated brake for each said member; and a source of fluid under pressure, the invention consisting of means to admit fluid under pressure from the fluid source to the disengageable elements and to the brakes and comprising: steering controls to regulate the admission of fluid under pressure to the disengageable element and to the brake on either side without affecting the disengageable element and the brake on the other side; brake controls to admit fluid under pressure to the brakes on both sides without affecting the disengageable elements; and means under the control of the brake controls further to regulate steering brake fluid pressure.

2. In a vehicle having at least one ground-engaging member on each side, a brake for each member, and means to actuate the brakes, the invention consisting of controls for the brakes and comprising: steering controls operable to actuate the brakes to apply steering braking to the member on either side, said steering braking being variable between a minimum and complete locking of the selected member; brake controls to actuate the brakes of both members substantially simultaneously and operable to apply a variable braking effect; and means to regulate the steering braking and operable upon the attainment of a predetermined braking effect by the brake controls.

3. In a vehicle having at least one ground-engaging member on each side, a brake for each member, and means to actuate the brakes, the invention consisting of controls for the brakes and comprising: steering controls operable to actuate the brakes to apply steering braking to the member on either side, said steering braking being variable between a minimum and complete locking of the selected member; brake controls to actuate the brakes of both members substantially simultaneously; and means under the control of the brake controls to limit the steering braking to a value less than enough for complete locking.

References Cited in the file of this patent
UNITED STATES PATENTS

| | | |
|---|---|---|
| 2,615,542 | LeTourneau | Oct. 28, 1952 |
| 2,669,330 | Banker | Feb. 11, 1954 |
| 2,712,370 | Westfall | July 5, 1955 |